US009550393B2

(12) United States Patent
Abe et al.

(10) Patent No.: US 9,550,393 B2
(45) Date of Patent: Jan. 24, 2017

(54) NON-PNEUMATIC TIRE

(71) Applicant: BRIDGESTONE CORPORATION, Tokyo (JP)

(72) Inventors: Akihiko Abe, Tokyo (JP); Masashi Nishida, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/438,490

(22) PCT Filed: Oct. 31, 2013

(86) PCT No.: PCT/JP2013/079550
§ 371 (c)(1),
(2) Date: Apr. 24, 2015

(87) PCT Pub. No.: WO2014/069570
PCT Pub. Date: May 8, 2014

(65) Prior Publication Data
US 2015/0283851 A1 Oct. 8, 2015

(30) Foreign Application Priority Data

Oct. 31, 2012 (JP) .................................. 2012-240523

(51) Int. Cl.
B60B 9/10 (2006.01)
B60C 7/14 (2006.01)
(Continued)

(52) U.S. Cl.
CPC . B60B 9/04 (2013.01); B60B 9/26 (2013.01); B60C 7/14 (2013.01); B60C 7/18 (2013.01); B60C 7/24 (2013.01); B60C 2007/146 (2013.04)

(58) Field of Classification Search
CPC ................ B60B 9/04; B60B 9/10; B60B 9/26; B60B 2360/348; B60C 7/08; B60C 7/14; B60C 7/16; B60C 7/18; B60C 7/20; B60C 2007/146
See application file for complete search history.

(56) References Cited

U.S. PATENT DOCUMENTS 94,839 A * 9/1869 Reed .......................... B60B 9/26
152/80
1,039,311 A 9/1912 Merrill
(Continued)

FOREIGN PATENT DOCUMENTS

CN 201931931 U 8/2011
EP 0051996 A2 5/1982
(Continued)

OTHER PUBLICATIONS

"Thermoplastic elastomers—Nomenclature and abbreviated terms", ISO 18064 First edition Sep. 1, 2003.
(Continued)

Primary Examiner — Frank Vanaman
(74) Attorney, Agent, or Firm — Sughrue Mion, PLLC

(57) ABSTRACT

A connecting member (15) includes connecting plates (21, 22) configured to connect an attachment body and a ring-shaped body (13), a plurality of curved sections (21d to 21j, 22d to 22j) curved in a tire circumferential direction are formed at the connecting plates (21, 22) in a direction in which the connecting plates (21, 22) extend in a side view of a tire when seen from a tire width direction, and in the plurality of curved sections (21d to 21j, 22d to 22j) of one of the connecting plates (21, 22), the thickness of a maximum curved section having largest central angles (θd to θj) about a center of curvature of the curved section (21d to 21j, 22d to 22j) is maximized, and the thickness of a minimum curved section having the smallest central angles (θd to θj) is minimized.

2 Claims, 6 Drawing Sheets

(51) Int. Cl.
*B60B 9/04* (2006.01)
*B60C 7/18* (2006.01)
*B60C 7/24* (2006.01)
*B60B 9/26* (2006.01)

(56) References Cited

U.S. PATENT DOCUMENTS

| | | | |
|---|---|---|---|
| 1,055,447 A | | 3/1913 | Craig |
| 1,591,982 A | | 7/1926 | Kirkwood |
| 1,828,322 A | * | 10/1931 | Kawalle ............... B60B 9/04 152/84 |
| 6,615,885 B1 | * | 9/2003 | Ohm ................... B60B 9/26 152/11 |
| 2007/0089820 A1 | * | 4/2007 | Gabrys ............... B60B 7/0086 152/69 |
| 2009/0243371 A1 | * | 10/2009 | Karlsson ............. B60B 9/26 301/79 |
| 2014/0251518 A1 | | 9/2014 | Abe et al. |
| 2015/0283852 A1 | * | 10/2015 | Chen .................. B60B 9/10 152/80 |

FOREIGN PATENT DOCUMENTS

| | | |
|---|---|---|
| GB | 117698 A | 8/1918 |
| GB | 1292928 A | 10/1972 |
| GB | 2042674 A | 9/1980 |
| JP | 2006-151002 A | 6/2006 |
| JP | 2011-025758 A | 2/2011 |
| JP | 2011-156905 A | 8/2011 |
| JP | 2012-91555 A | 5/2012 |
| NL | 2002956 C | 12/2010 |
| WO | 2010/012091 A1 | 2/2010 |
| WO | 2013/152067 A1 | 10/2013 |

OTHER PUBLICATIONS

International Search Report of PCT/JP2013/079550, dated Dec. 10, 2013. [PCT/ISA/210], English Translation.

* cited by examiner

NON-PNEUMATIC TIRE

CROSS REFERENCE TO RELATED APPLICATIONS

This application is a National Stage of International Application No. PCT/JP2013/079550filed Oct. 31, 2013, claiming priority based on Japanese Patent Application No. 2012-240523, filed Oct. 31, 2012, the contents of all of which are incorporated herein by reference in their entirety.

TECHNICAL FIELD

The present invention relates to a non-pneumatic tire in which pressurized air need not be filled upon use.

Priority is claimed on Japanese Patent Application No. 2012-240523, filed Oct. 31, 2012, the content of which is incorporated herein by reference.

BACKGROUND ART

In a pneumatic tire of the related art that is filled with pressurized air and used, occurrence of a blowout is a structurally unavoidable problem.

In order to solve this problem, in recent years, for example, a non-pneumatic tire as disclosed in the following Patent Document 1 is proposed.

DOCUMENT OF RELATED ART

Patent Document

[Patent Document 1] Japanese Unexamined Patent Application, First Publication No. 2011-156905

SUMMARY OF INVENTION

Technical Problem

However, in the non-pneumatic tire of the related art, sufficient strength should be secured more while limiting an increase in weight.

In consideration of the above-described circumstances, the present invention is directed to provide a non-pneumatic tire capable of securing sufficient strength while limiting an increase in weight.

Solution to Problem

In a non-pneumatic tire of a first aspect of the present invention, in curved sections of one connecting plate, the thickness of a maximum curved section having a largest central angle, in which bending deformation is largely generated to cause easy application of a load, is maximized, and the thickness of a minimum curved section having a smallest central angle, in which bending deformation cannot be easily generated to cause difficulty in application of the load, is minimized. For this reason, sufficient strength can be easily secured while limiting an increase in weight.

In a non-pneumatic tire of a second aspect of the present invention, in the first aspect, since the curved section joined to first end section of the connecting plate to which a load is most easily applied becomes the maximum curved section, strength of the connecting plate can be effectively increased. Meanwhile, since the curved section disposed at an intermediate portion becomes the minimum curved section, sufficient strength can be securely obtained while limiting an increase in weight.

In a non-pneumatic tire of a third aspect of the present invention, in the first or second aspect, in the intermediate portions of the first connecting plate and the second connecting plate, the curved sections separately joined to first end section and the second end section protrude in opposite directions in the tire circumferential direction. For this reason, when an external force is applied to the non-pneumatic tire, the first connecting plate and the second connecting plate can be easily elastically deformed, and flexibility can be provided in the non-pneumatic tire to secure good ride comfort.

In a non-pneumatic tire of a fourth aspect of the present invention, in any one of the first to third aspects, since the exterior body, the ring-shaped body and the plurality of connecting members are integrally formed with each other, when the non-pneumatic tire is assembled, even though both end sections of the plurality of connecting members are not separately connected to the exterior body and the ring-shaped body, it is sufficient if the ring-shaped body and the plurality of connecting members are mounted on the attachment body in a state in which they are integrally formed with each other, and thus manufacturing time can be reduced.

In addition, since the ring-shaped body and the plurality of connecting members are integrally formed with each other, for example, an increase in weight can be limited in comparison with the case in which both end sections of the connecting member, the exterior body and the ring-shaped body are connected using a fastening member or the like. In addition, as connecting portions of the connecting member and the ring-shaped body are integrally formed with each other, stress concentration can be attenuated in comparison with a case in which both of them are connected using the fastening member or the like.

Effects of the Invention

In the present invention, sufficient strength can be secured while supporting an increase in weight.

DESCRIPTION OF EMBODIMENTS

Hereinafter, an embodiment of a non-pneumatic tire according to the present invention will be described with reference to the accompanying drawings.

Further, a non-pneumatic tire 1 of the embodiment may be employed in a compact vehicle or the like that runs at a low speed, for example, electrically power scooters or the like defined by Japanese Industrial Standard JIS T 9208. In addition, in the following description, the non-pneumatic tire 1 having a tire size of, for example, 3.00-8 will be described.

Figure 1:
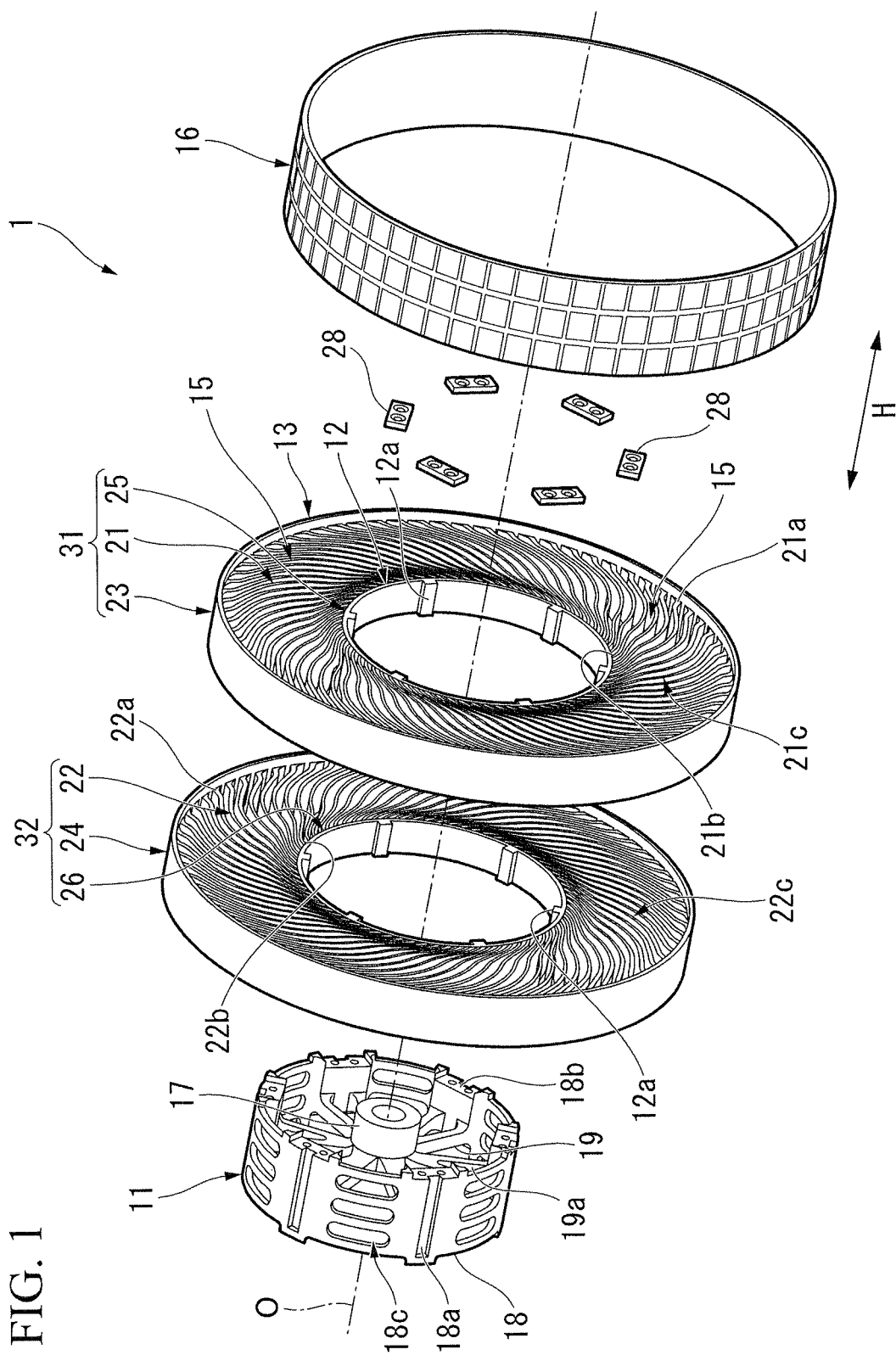
FIG. 1 is a partially exploded schematic perspective view of a non-pneumatic tire of an embodiment of the present invention.
Figure 2:
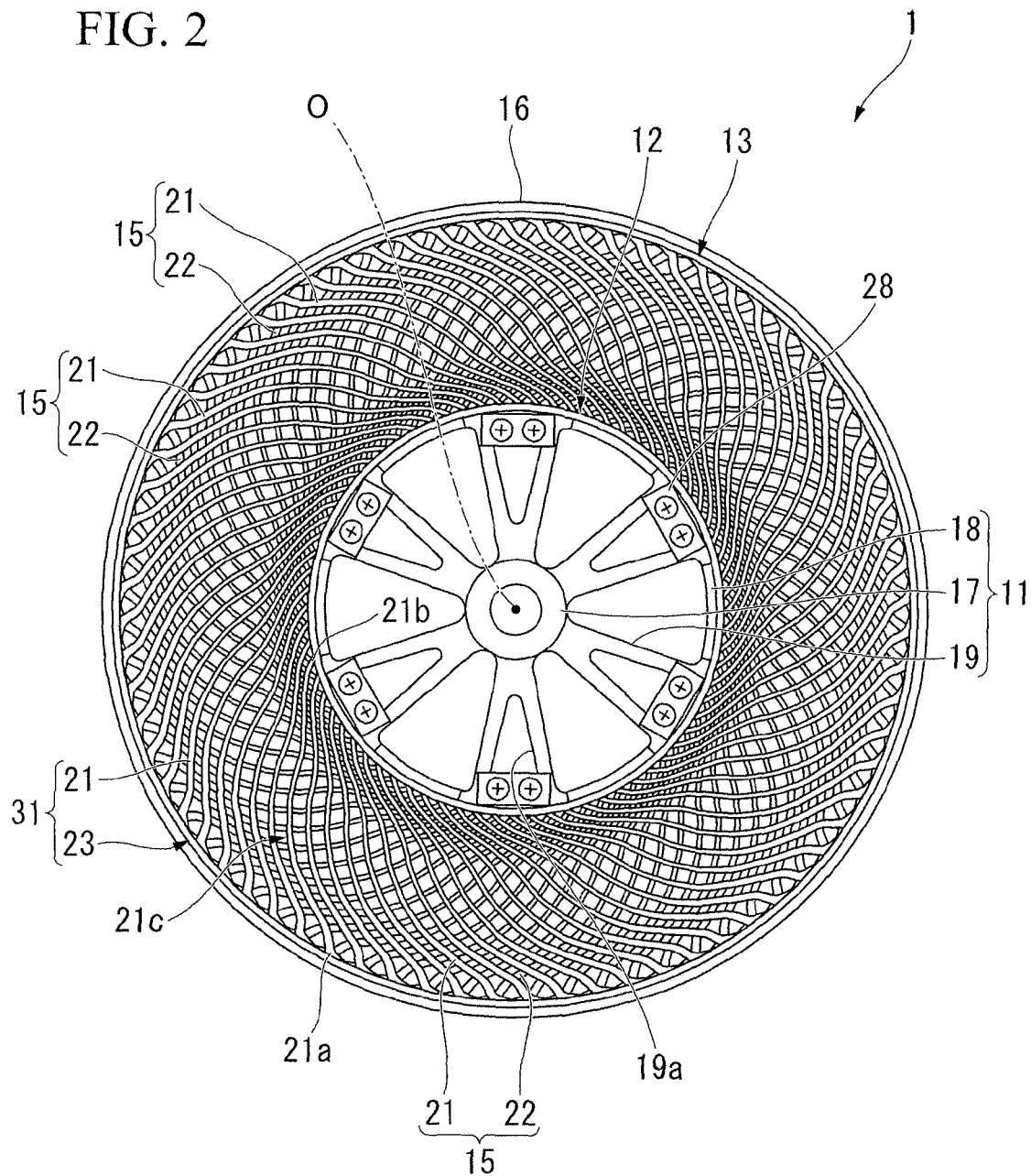
FIG. 2 is a side view of the non-pneumatic tire shown in FIG. 1 seen from first side in a tire width direction.

As shown in FIGS. 1 and 2, the non-pneumatic tire 1 of the embodiment includes an attachment body 11 attached to an axle (not shown), a ring-shaped body 13 configured to surround the attachment body 11 from the outside in a tire radial direction, a plurality of connecting members 15 disposed between the attachment body 11 and the ring-shaped body 13 in a tire circumferential direction and configured to connect the attachment body 11 and the ring-shaped body 13 in a relatively elastically displaceable manner, and a tread member 16 disposed at an outer circumferential surface side of the ring-shaped body 13 throughout the entire circumference.

Here, the attachment body 11, the ring-shaped body 13 and the tread member 16 are disposed on the same axis as a common axis. Hereinafter, the common axis is referred to as an axis O, a direction along the axis O is referred to as a tire width direction H, a direction perpendicular to the axis O is referred to as a tire radial direction, and a direction around the axis O is referred to as a tire circumferential direction. Further, the attachment body 11, the ring-shaped body 13 and the tread member 16 are disposed such that central sections in the tire width direction H coincide with each other.

The attachment body 11 includes a mounting rim section 17 on which a front end section of the axle is mounted, an outer ring section 18 configured to surround the mounting rim section 17 from the outside in the tire radial direction, and a plurality of ribs 19 configured to connect the mounting rim section 17 and the outer ring section 18.

The mounting rim section 17, the outer ring section 18 and the ribs 19 are integrally formed of a metal material such as an aluminum alloy or the like. The mounting rim section 17 and the outer ring section 18 are formed in a cylindrical shape and disposed on the same axis as the axis O. The plurality of ribs 19 are point-symmetrically disposed with respect to the axis O.

A plurality of key groove sections 18a concaved inward in the tire radial direction and extending in the tire width direction H are formed at an outer circumferential surface of the outer ring section 18 at intervals in the tire circumferential direction. In the outer circumferential surface of the outer ring section 18, the key groove sections 18a are opened at only first side of both ends in the tire width direction H and closed at the second side.

Further, a plurality of hole arrays 18c, in each of which a plurality of weight-reducing holes passing in the tire radial direction are disposed at intervals in the tire width direction H, are formed at a portion of the outer ring section 18 disposed between the key groove sections 18a which are adjacent in the tire circumferential direction at intervals in the tire circumferential direction. In addition, weight-reducing holes 19a passing in the tire width direction H are also formed in the ribs 19.

In addition, in an edge of first side in the tire width direction H of the outer ring section 18, concave sections 18b concaved toward the second side in the tire width direction H and into which plate members 28 are fitted are formed at positions corresponding to the key groove sections 18a. Through-holes are formed in the plate members 28, and in the wall surfaces that form the concave sections 18b, female screw sections in communication with the through-holes of the plate members 28 fitted into the concave sections 18b are formed in bottom wall surfaces facing the first side in the tire width direction H. Further, the plurality of female screw sections and the plurality of through-holes are formed at intervals in the tire circumferential direction.

Then, a cylindrical exterior body 12 is fitted onto the attachment body 11. A plurality of ridge sections 12a protruding inward in the tire radial direction and extending throughout the entire length in the tire width direction H are disposed at an inner circumferential surface of the exterior body 12 at intervals in the tire circumferential direction. The ridge sections 12a are fitted into the key groove sections 18a of the attachment body 11.

The exterior body 12 is fixed to the attachment body 11 as the plate member 28 is fixed into the concave section 18b in a state in which the ridge section 12a is fitted into the key groove section 18a. In this state, the ridge section 12a is sandwiched between the plate member 28 and a bottom wall surface of the concave section 18b in the tire width direction H.

Further, in wall surfaces configured to form the key groove section 18a, a pair of side wall surfaces opposite to each other in the tire circumferential direction are perpendicular to a bottom wall surface. In addition, in outer surfaces of the ridge section 12a, the pair of side wall surfaces standing upward from the inner circumferential surface of the exterior body 12 are perpendicular to a top wall surface directed inward in the tire radial direction. Further, sizes in the tire circumferential direction of the ridge section 12a and the key groove section 18a are equal to each other.

In addition, the ring-shaped body 13 has a larger size, i.e., a larger width in the tire width direction H, than the exterior body 12, and in the example shown, the ring-shaped body 13 is formed in a cylindrical shape.

The connecting member 15 connects an outer circumferential surface side of the attachment body 11 and an inner circumferential surface side of the ring-shaped body 13, and in the example shown, the connecting member 15 includes a first connecting plate 21 and a second connecting plate 22, which are elastically deformable, configured to connect an outer circumferential surface of the exterior body 12 and an inner circumferential surface of the ring-shaped body 13.

In the connecting member 15, the plurality of first connecting plates 21 are disposed in the tire circumferential direction at one position in the tire width direction H (first side in the tire width direction H), and the plurality of second connecting plates 22 are disposed in the tire circumferential direction at another position in the tire width direction H (the second side in the tire width direction H) different from the one position in the tire width direction H. That is, the plurality of first connecting plates 21 are disposed in the tire circumferential direction at the same position in the tire width direction H, and the plurality of second connecting plates 22 are disposed in the tire circumferential direction at the same position in the tire width direction H spaced apart from the first connecting plate 21 in the tire width direction H. Further, in the example shown, 60 of each of the connecting plates 21 and 22 are installed in the tire circumferential direction.

Further, the plurality of connecting members 15 are disposed between the exterior body 12 and the ring-shaped body 13 at point-symmetrical positions with respect to the axis O. In addition, all the connecting members 15 have the same shape and the same size. Further, a width of the connecting member 15 is smaller than a width of the ring-shaped body 13.

Then, in a state in which a compressive load is not applied in the tire radial direction, the first connecting plates 21 which are adjacent in the tire circumferential direction come out of contact with each other. Similarly, the second connecting plates 22 which are adjacent in the tire circumferential direction also come out of contact with each other in the state in which the compressive load is not applied in the tire radial direction. Further, the first connecting plates 21 and the second connecting plates 22 which are adjacent in the tire width direction H also come out of contact with each other.

Further, the widths of the first connecting plate 21 and the second connecting plate 22 are equal to each other.

In addition, the thicknesses of the first connecting plate 21 and the second connecting plate 22 are equal to each other.

Figure 3:
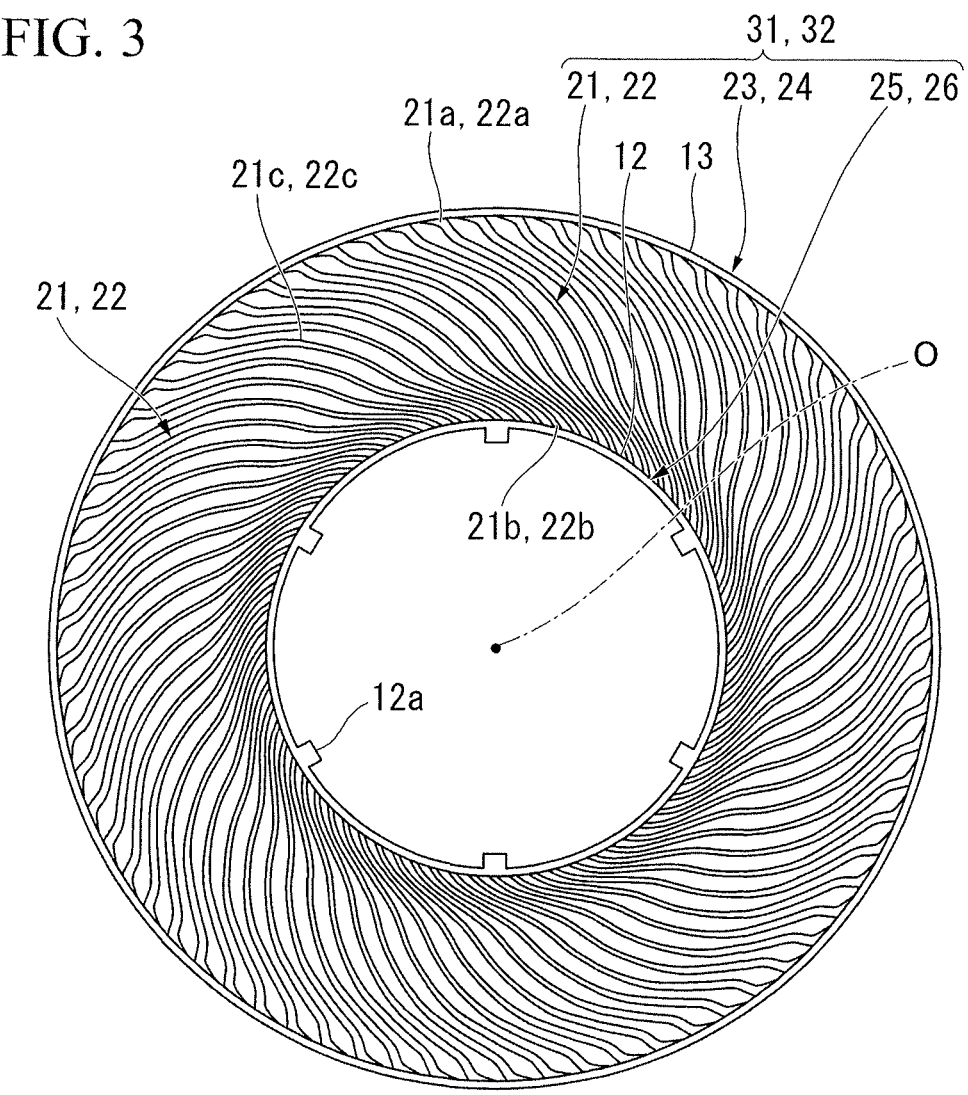
FIG. 3 is a plan view when a first split case body of the non-pneumatic tire shown in FIG. 1 is seen from first side in the tire width direction, or a plan view when a second split case body is seen from the second side in the tire width direction.
Figure 4:
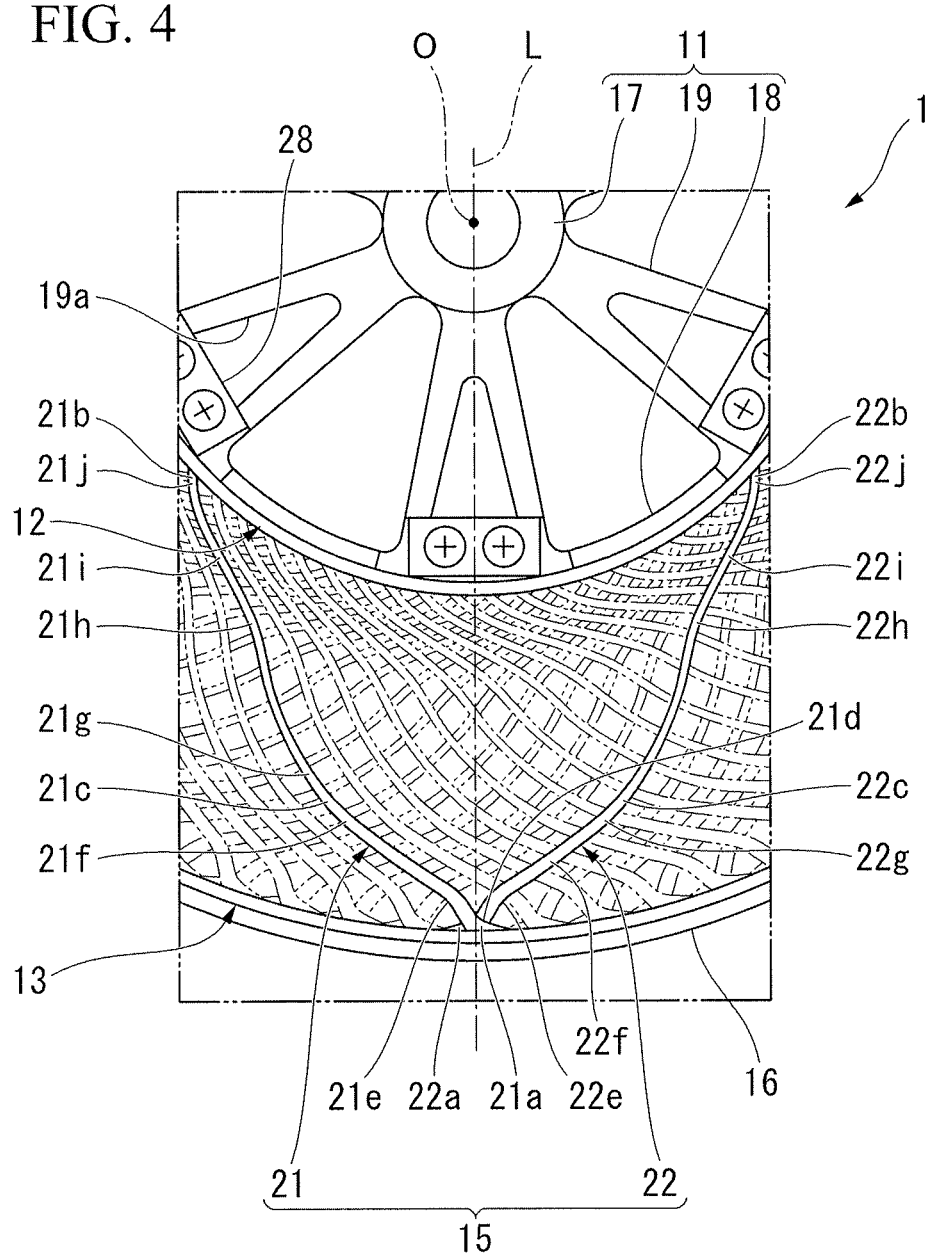
FIG. 4 is an enlarged view showing a major part of FIG. 2.

As shown in FIGS. 2 to 4, first end section 21a of the first connecting plate 21 connected to the ring-shaped body 13 is disposed closer to first side in the tire circumferential direction than the second end section 21b connected to the exterior body 12, and a first end section 22a of the second connecting plate 22 connected to the ring-shaped body 13 is disposed closer to the second side in the tire circumferential direction than a second end section 22b connected to the exterior body 12.

In addition, the first end sections 21a and 22a of the first connecting plate 21 and the second connecting plate 22 of the one connecting member 15 are disposed at different positions in the tire width direction H and connected at the same position in the tire circumferential direction to the inner circumferential surface of the ring-shaped body 13.

Figure 5A:
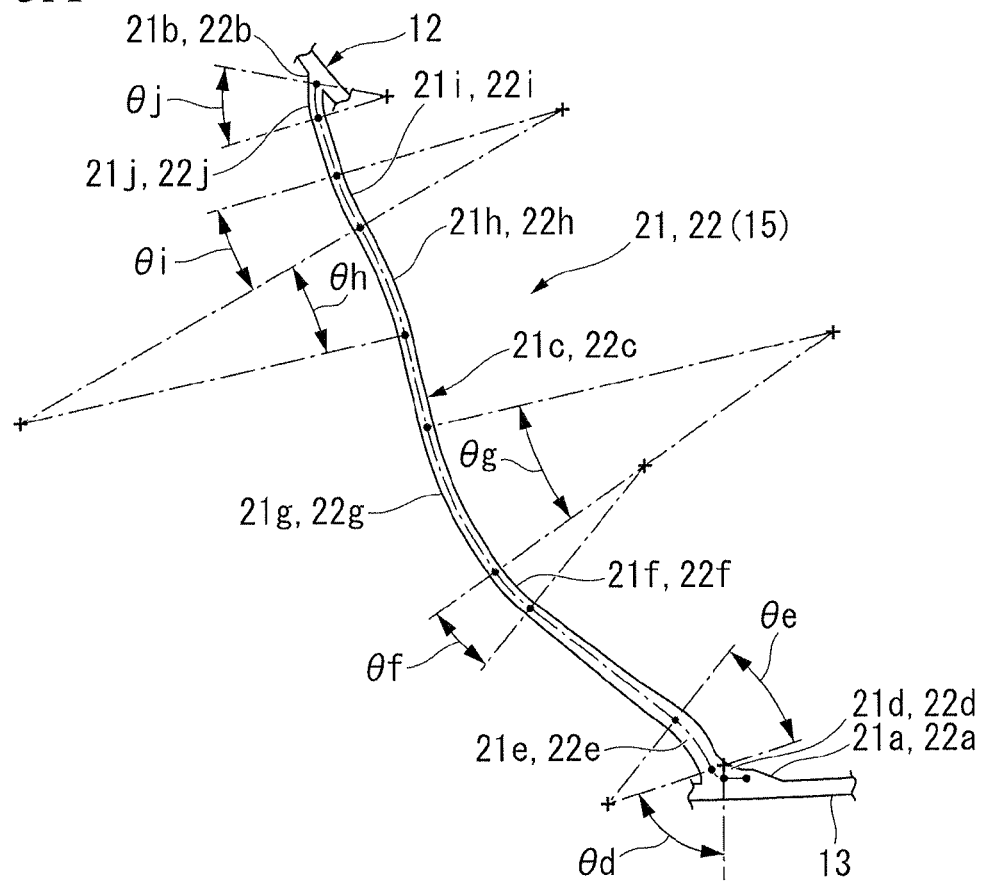
FIG. 5A is an enlarged view showing a connecting plate of the embodiment (Example 1) of a non-pneumatic tire having a tire size of 3.00-8.

As shown in FIG. 5A, in the first connecting plate 21 and the second connecting plate 22, a plurality of (in the example shown, seven) curved sections 21d to 21j and 22d to 22j curved in the tire circumferential direction are formed at intermediate portions 21c and 22c disposed between the first end sections 21a and 22a and the second end sections 21b and 22b in a direction in which the connecting plates 21 and 22 extend in the side view of the tire when the non-pneumatic tire 1 is seen from the tire width direction H.

Specifically, the plurality of curved sections 21d to 21j formed at the first connecting plate 21 have the first curved section 21d curved to protrude toward the second side in the tire circumferential direction, the second curved section 21e curved to protrude toward the first side in the tire circumferential direction, the third curved section 21f and the fourth curved section 21g curved to protrude toward the second side in the tire circumferential direction, the fifth curved section 21h curved to protrude toward the first side in the tire circumferential direction, and the sixth curved section 21i and the seventh curved section 21j curved to protrude toward the second side in the tire circumferential direction, which are sequentially formed in the above-described extension direction from the first end section 21a to the second end section 21b.

The plurality of curved sections 22d to 22j formed at the second connecting plate 22 have the first curved section 22d curved to protrude toward the first side in the tire circumferential direction, the second curved section 22e curved to protrude toward the second side in the tire circumferential direction, the third curved section 22f and the fourth curved section 22g curved to protrude toward the first side in the tire circumferential direction, the fifth curved section 22h curved to protrude toward the second side in the tire circumferential direction, and the sixth curved section 22i and the seventh curved section 22j curved to protrude toward the first side in the tire circumferential direction, which are sequentially formed in the above-described extension direction from the first end section 22a to the second end section 22b.

That is, in both of the connecting plates 21 and 22, in the plurality of curved sections 21d to 21j and 22d to 22j, curve directions of the third curved sections 21f and 22f and the fourth curved sections 21g and 22g, and the sixth curved sections 21i and 22i and the seventh curved sections 21j and 22j which are adjacent in the above-described extension direction are the same direction, and curve directions of the other curved sections are opposite thereto.

In addition, in the curved sections 21d to 21j and 22d to 22j of the connecting plates 21 and 22, the first curved sections 21d and 22d and the seventh curved sections 21j and 22j disposed at both ends in the above-described extension direction (the curved sections separately joined to the first end sections 21a and 22a and the second end sections 21b and 22b) curve in the same direction.

In the curved sections 21d to 21j and 22d to 22j, the first curved sections 21d and 22d and the seventh curved sections 21j and 22j disposed at both ends in the above-described extension direction have a smaller radius of curvature in the side view of the tire than the other curved sections 21e to 21i and 22e to 22i disposed at a central section of the extension direction. Further, in the curved sections 21d to 21j and 22d to 22j, the first curved sections 21d and 22d have the smallest radius of curvature.

Here, in the curved sections 21d to 21j and 22d to 22j of the embodiment, as central angles θd to θj about a center of curvature increase, the thicknesses in the tire circumferential direction of the connecting plates 21 and 22 increase. Specifically, in the curved sections 21d to 21j and 22d to 22j, the central angle θd of the first curved sections 21d and 22d joined to the first end sections 21a and 22a is maximized to constitute a maximum curved section having a maximum thickness, and the central angle θi of the sixth curved sections 21i and 22i disposed at the intermediate portions 21c and 22c is minimized to constitute a minimum curved section having a minimum thickness.

In the example shown, central angles are reduced and thicknesses are reduced in sequence of the first curved sections 21d and 22d (the central angle θd is, for example, 70.5°), the second curved sections 21e and 22e (the central angle θe is, for example, 33.0°), the seventh curved sections 21j and 22j (the central angle θj is, for example, 27.4°), the fourth curved sections 21g and 22g (the central angle θg is, for example, 22.5°), the fifth curved sections 21h and 22h (the central angle θh is, for example, 17.4°), the third curved sections 21f and 22f (the central angle θf is, for example, 15.7°), and the sixth curved sections 21i and 22i (the central angle θi is, for example, 13.9°).

Further, connecting portions between the curved sections 21d to 21j and 22d to 22j adjacent to each other have gradually varying thicknesses, for example, from one curved section toward the other curved section adjacent to the one curved section. That is, the curved sections 21d to 21j and 22d to 22j which are adjacent to each other are smoothly joined to each other with no step.

In addition, the thicknesses of the curved sections 21d to 21j and 22d to 22j may be set within a range of 0.1 mm to 5.0 mm. When the thicknesses are set to 0.1 mm or more, strength of the connecting plates 21 and 22 can be secured.

Meanwhile, when the thickness is set to 5.0 mm or less, flexibility of the connecting plates 21 and 22 can be secured, and generation of shrinkage when the connecting plates 21 and 22 are manufactured through injection molding can be limited while limiting an increase in weight.

Further, the lengths of both of the connecting plates 21 and 22 are equal, and as shown in FIG. 4, in the side view of the tire, the second end sections 21b and 22b of both of the connecting plates 21 and 22 are separately connected at positions spaced apart from each other by the same angle (for example, 20° to 135°) from positions opposite to the first end sections 21a and 22a in the tire radial direction to a first side and a second side in the tire circumferential direction about the axis O on the outer circumferential surface of the exterior body 12. In addition, the curved sections 21d to 21j and 22d to 22j (see FIG. 5A) of the first connecting plate 21 and the second connecting plate 22 protrude in directions opposed to each other in the tire circumferential direction and are the same size.

Accordingly, shapes of the connecting members 15 in the side view of the tire are line-symmetrical with respect to an imaginary line L extending in the tire radial direction and passing the first end sections 21a and 22a of both of the connecting plates 21 and 22.

Here, in the embodiment, the exterior body 12, the ring-shaped body 13 and the plurality of connecting members 15 are integrally formed with each other.

Further, in the embodiment, as shown in FIG. 1, the exterior body 12 is split into first side split exterior body 25 disposed at first side in the tire width direction H and the second side split exterior body 26 disposed at the second side in the tire width direction H. In addition, the ring-shaped body 13 is split into first side split ring-shaped body 23 disposed at a first side in the tire width direction H and a second side split ring-shaped body 24 disposed at a second side in the tire width direction H. Further, in the example shown, the exterior body 12 and the ring-shaped body 13 are split at a central section in the tire width direction H.

Then, the first side split exterior body 25 and the first side split ring-shaped body 23 are integrally formed with the first connecting plate 21, and the second side split exterior body 26 and the second side split ring-shaped body 24 are integrally formed with the second connecting plate 22.

Further, in the embodiment, the first side split exterior body 25, the first side split ring-shaped body 23 and the first connecting plate 21, and the second side split exterior body 26, the second side split ring-shaped body 24 and the second connecting plate 22 are integrally formed through casting or injection molding.

Hereinafter, a member obtained by integrally forming the first side split exterior body 25, the first side split ring-shaped body 23 and the first connecting plate 21 is referred to as a first split case body 31, and a member obtained by integrally forming the second side split exterior body 26, the second side split ring-shaped body 24 and the second connecting plate 22 is referred to as a second split case body 32.

Here, the injection molding may be a general method of simultaneously forming both of the entire first and second split case bodies 31 and 32, and in the split case bodies 31 and 32, one of the one and the other split ring bodies 23 and 24 and the first and second elastic connecting plates 21 and 22 may be an insert product, and the other may be an insert molding product formed through injection molding, or so-called two color formation, or the like.

In addition, in the split case bodies 31 and 32, the split exterior bodies 25 and 26, the split ring-shaped bodies 23 and 24, and the connecting plates 21 and 22 may be formed of different materials, or may be formed of the same material. Further, the material may be a metal material, a resin material, or the like, and may preferably be, in view of a reduction in weight, a resin material, and in particular, a thermoplastic resin.

In addition, when both of the entire split case bodies 31 and 32 are simultaneously injection-molded, the plurality of ridge section 12a formed at the exterior body 12 may be a gate portion.

In the split case bodies 31 and 32, a central section in the tire width direction H of the connecting plates 21 and 22, a central section in the tire width direction H of the ring-shaped body 13, and a central section in the tire width direction H of the exterior body 12 coincide with each other. In addition, the exterior body 12 has a smaller width than the ring-shaped body 13, and the same width as the first connecting plate 21 and the second connecting plate 22.

Then, edges in the tire width direction H of the split ring-shaped bodies 23 and 24 are connected by, for example, welding, fusion, adhesion, or the like. Further, among these, in the case of the welding, hot plate welding or the like may be employed.

In addition, edges in the tire width direction H of the split exterior bodies 25 and 26 are separated from each other in the tire width direction H. Accordingly, generation of burrs on the inner circumferential surface of the exterior body 12 fitted onto the attachment body 11 is prevented.

In addition, the split case bodies 31 and 32 have the same shape and the same size as shown in FIG. 3 in a state before the bodies 31 and 32 are connected as described above.

Then, when the split case bodies 31 and 32 are connected as described above, the edges in the tire width direction H of the ring-shaped bodies 13 of the split case bodies 31 and 32 match to be connected to each other in a state in which directions in the tire width direction H of both of the split case bodies 31 and 32 are opposite to each other while matching the positions in the tire circumferential direction of the split case bodies 31 and 32 such that the connecting members 15 are line-symmetrical to each other as described above when seen in the side view of the tire.

The tread member 16 is formed in a cylindrical shape, integrally covers the outer circumferential surface of the ring-shaped body 13 throughout the entire region, and in the example shown, the inner circumferential surface of the tread member 16 is closely adhered to the outer circumferential surface of the ring-shaped body 13 throughout the entire region. The tread member 16 is formed of, for example, natural rubber or/and vulcanized rubber in which a rubber composition is vulcanized, a thermoplastic material, or the like. For example, a thermoplastic elastomer, a thermoplastic resin, or the like is provided as the thermoplastic material. For example, an amide-based thermoplastic elastomer (TPA), an ester-based thermoplastic elastomer (TPC), an olefin-based thermoplastic elastomer (TPO), a styrene-based thermoplastic elastomer (TPS), a urethane-based thermoplastic elastomer (TPU), a thermoplastic rubber cross-linked body (TPV), or another thermoplastic elastomer (TPZ) or the like, defined by Japanese Industrial Standards JIS K6418, is provided as the thermoplastic elastomer. For example, a urethane resin, an olefin resin, a polyvinyl chloride resin, a polyamide resin, or the like, is provided as the thermoplastic resin. Further, in view of an abrasion resistance property, the tread member 16 may be formed of the vulcanized rubber.

As described above, according to the non-pneumatic tire 1 of the embodiment, in the curved sections 21d to 21j and 22d to 22j of the one connecting plates 21 and 22, a thickness of a maximum curved section (for example, the first curved sections 21d and 22d), in which bending deformation is largely generated to cause easy application of a load and a central angle is maximized, is maximized, and a thickness of a minimum curved section (for example, the sixth curved sections 21i and 22i), in which bending deformation cannot be easily generated to cause difficulty in application of the load and the central angle is minimized, is minimized. For this reason, sufficient strength can be easily secured while limiting an increase in weight.

In particular, in the embodiment, in the connecting plates 21 and 22, since the first curved sections 21d and 22d joined to the first end sections 21a and 22a, in which the load is most easily applied, become the maximum curved section, strength of the connecting plates 21 and 22 can be effectively increased. Meanwhile, since the sixth curved sections 21i and 22i disposed at the intermediate portions 21c and 22c become the minimum curved section, sufficient strength can be securely obtained while limiting an increase in weight.

In addition, in the intermediate portions 21c and 22c of the first connecting plate 21 and the second connecting plate 22 of the embodiment, the curved sections (the first curved sections 21d and 22d and the seventh curved sections 21j and 22j) disposed at the connecting portions separately joined to the first end sections 21a and 22a and the second end sections 21b and 22b protrude in directions opposed to each other in the tire circumferential direction. For this reason, when an external force is applied to the non-pneumatic tire 1, the first connecting plate 21 and the second connecting plate 22 can be easily elastically deformed, and flexibility can be provided in the non-pneumatic tire 1 to secure good ride comfort.

Further, since the plurality of first connecting plates 21 are disposed in the tire circumferential direction at one positions in the tire width direction H, and the plurality of second connecting plates 22 are disposed in the tire circumferential direction at other positions in the tire width direction H, interference of the connecting members 15 which are adjacent in the tire circumferential direction can be limited, and restriction in a disposition number can be limited.

In addition, since the connecting members 15 are formed line-symmetrically with respect to the imaginary line L when seen in the side view of the tire, generation of a difference between a spring constant along first side in the tire circumferential direction and a spring constant along the second side in the non-pneumatic tire 1 can be limited, and good controllability can be provided.

Further, in the embodiment, since the exterior body 12, the ring-shaped body 13 and the plurality of connecting members 15 are integrally formed with each other, when the non-pneumatic tire 1 is assembled, even when both end sections of the plurality of connecting members 15 are not connected to the exterior body 12 and the ring-shaped body 13, since it is sufficient if the end sections are mounted on the attachment body 11 in a state in which the ring-shaped body 13 and the plurality of connecting members 15 are integrally formed with each other, manufacturing time can be reduced.

In addition, since the ring-shaped body 13 and the plurality of connecting members 15 are integrally formed with each other, for example, an increase in weight can be limited in comparison with the case in which both end sections of the connecting member 15, the exterior body 12 and the ring-shaped body 13 are connected using a fastening member or the like. In addition, as the connecting portions of the connecting member 15 and the ring-shaped body 13 are integrally formed with each other, stress concentration can be attenuated in comparison with the case in which both of them are connected using the fastening member or the like.

Further, in the above-described embodiment, while the non-pneumatic tire 1 having a tire size of, for example, 3.00-8 has been described, the present invention is not limited thereto but may be applied to the non-pneumatic tire 1 having various sizes. Hereinafter, the non-pneumatic tire 1 having a tire size of, for example, 4.00-5 will be described. Further, in the following description, components that are the same as those of the above-described embodiment are designated by the same reference numerals, and a description thereof will be omitted.

Figure 6A:
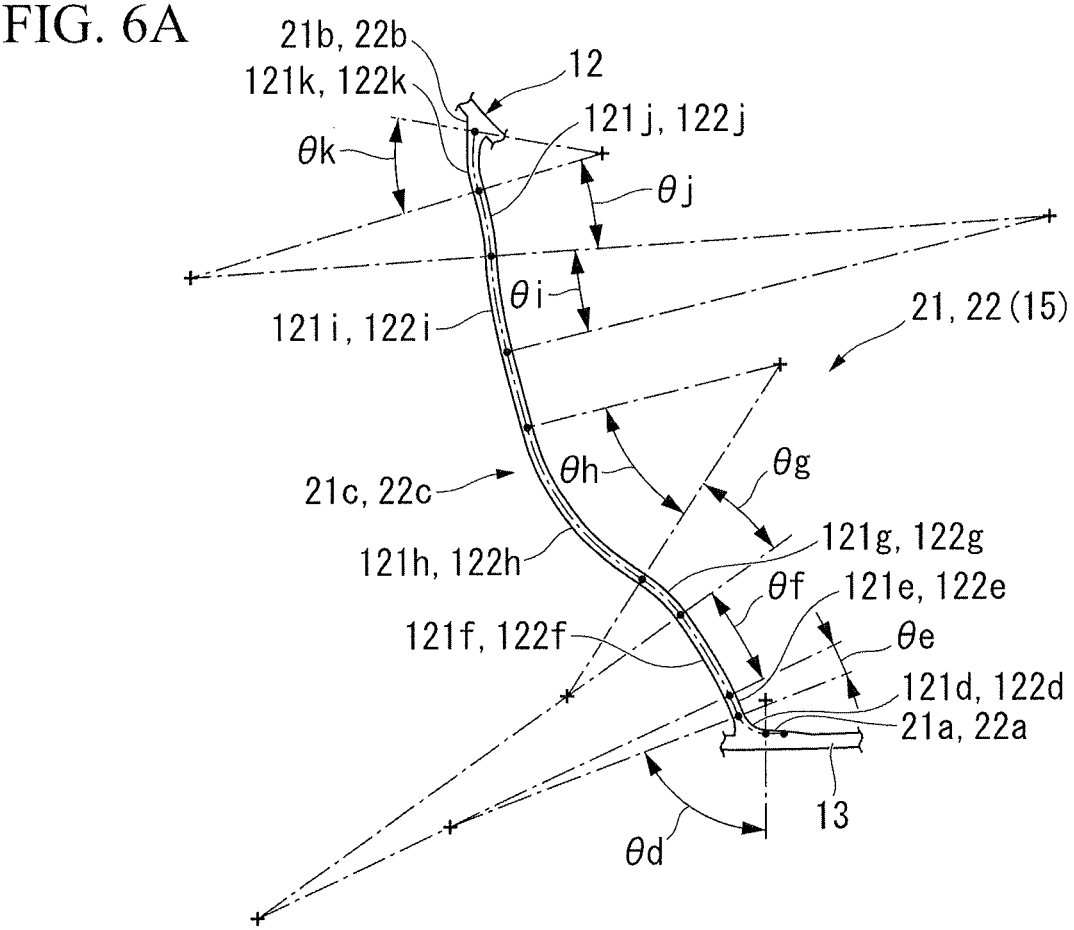
FIG. 6A is an enlarged view showing a connecting plate of an embodiment (Example 2) of a non-pneumatic tire having a tire size of 4.00-5.

As shown in FIG. 6A, in the first connecting plate 21 and the second connecting plate 22, a plurality of (in the example shown, 8) curved sections 121d to 121k and 122d to 122k curved in the tire circumferential direction are formed at the intermediate portions 21c and 22c disposed between the first end sections 21a and 22a and the second end sections 21b and 22b in a direction in which the connecting plates 21 and 22 extend in the side view of the tire when the non-pneumatic tire 1 is seen from the tire width direction H.

Specifically, the plurality of curved sections 121d to 121k formed at the first connecting plate 21 have the first curved section 121d curved to protrude toward the second side in the tire circumferential direction, the second curved section 121e, the third curved section 121f and the fourth curved section 121g curved to protrude toward first side in the tire circumferential direction, the fifth curved section 121h and the sixth curved section 121i curved to protrude toward the second side in the tire circumferential direction, the seventh curved section 121j curved to protrude toward first side in the tire circumferential direction, and the eighth curved section 121k curved to protrude toward the second side in the tire circumferential direction, which are formed in sequence in the above-described extension direction from the first end section 21a to the second end section 21b.

Further, the curved sections 122d to 122k of the second connecting plate 22 protrude in opposite directions with respect to the curved sections 121d to 121k of the first connecting plate 21 in the tire circumferential direction and are the same size.

Like the above-described embodiment, the curved sections 121d to 121k and 122d to 122k of the embodiment have a thickness that increases in the tire circumferential direction as the central angles θd to θk about a center of curvature thereof increase. Specifically, in the curved sections 121d to 121k and 122d to 122k, a configuration in which the central angle θd of the first curved sections 121d and 122d joined to the first end sections 21a and 22a is maximized and a maximum curved section has a largest thickness is provided, and a configuration in which the central angle θe of the second curved sections 121e and 122e disposed at the intermediate portions 21c and 22c is minimized and a minimum curved section has the smallest thickness is provided.

Central angles are reduced and thicknesses of the curved sections 121d to 121k and 122d to 122k are reduced in sequence of, in the example shown, the first curved sections 121d and 122d (the central angle θd is, for example, 68.48°), the fifth curved sections 121h and 122h (the central angle θh is, for example, 43.6°), the eighth curved sections 121k and 122k (the central angle θk is, for example, 27.2°), the fourth curved sections 121g and 122g (the central angle θg is, for example, 21.9°), the seventh curved sections 121j and 122j (the central angle θj is, for example, 13.0°), the third curved sections 121f and 122f (the central angle θf is, for example, 10.4°), the sixth curved sections 121*i* and 122*i* (the central angle θi is, for example, 10.2°) and the second curved sections 21*e* and 22*e* (the central angle θe is, for example, 4.3°).

Here, the inventor(s) performed verification tests to compare weights and strengths in Examples 1 and 2 and Comparative Examples 1 and 2 having two kinds of different tire sizes.

Figure 5B:
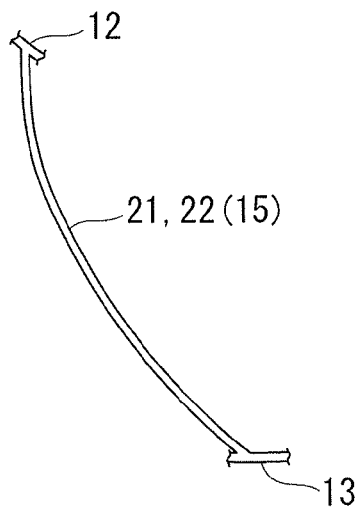
FIG. 5B is an enlarged view showing a connecting plate of Comparative Example 1 of the non-pneumatic tire having a tire size of 3.00-8.
Figure 6B:
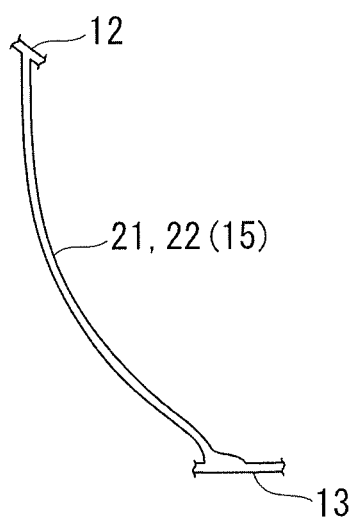
FIG. 6B is an enlarged view showing a connecting plate of Comparative Example 2 of the non-pneumatic tire having a tire size of 4.00-5.

In the tests, the non-pneumatic tire shown in FIG. 5A was employed as Example 1, and the non-pneumatic tire 1 shown in FIG. 6A was employed as Example 2. In addition, as Comparative Examples 1 and 2 corresponding to Examples 1 and 2, respectively, as shown in FIGS. 5B and 6B, in the non-pneumatic tire having the same size as the corresponding Examples 1 and 2, a configuration in which the thickness in the tire circumferential direction of the connecting plates 21 and 22 was formed in the direction in which the connecting plates 21 and 22 extended was employed. In this case, for example, the thickness of the connecting plates 21 and 22 of Comparative Examples 1 and 2 was an average of the thickness of the connecting plates 21 and 22 of Examples. Further, in Comparative Examples 1 and 2 shown in FIGS. 5B and 6B, portions corresponding to Examples 1 and 2 are designated by the same reference numerals.

The results of the tests under the above-described conditions showed that the non-pneumatic tire of each of Examples can secure sufficient strength with the tire size while attempting a decrease in weight in comparison with the non-pneumatic tire of each of Comparative Examples. Specifically, if the weight and strength of Comparative Example 1 are both set at 100, it was confirmed that, in Example 1, the weight was 90 and the strength was 210. In addition, if the weight and strength of Comparative Example 2 are both set at 100, it was confirmed that, in Example 2, the weight was 93 and the strength was 135.

This is considered to be due to the fact that, in the curved sections, the thickness of a portion having a large central angle, in which bending deformation is largely generated to cause easy application of a load, is increased to secure strength, while the thickness of a portion having a small central angle, in which bending deformation cannot be easily generated to cause difficulty in application of the load, is reduced to suppress an increase in weight.

Further, the technical spirit of the present invention is not limited to the embodiments but various modifications may be made without departing from the spirit of the present invention.

For example, the curve direction of the curved section in the first connecting plate 21 and the curve direction of the curved section in the second connecting plate 22 may be appropriately varied without being limited to the above-described embodiments.

Further, in the above-described embodiments, while the case in which, in the curved sections, for example, the first curved sections 21*d* and 22*d* joined to the first end sections 21*a* and 22*a* are maximum curved sections, and for example, the sixth curved sections 21*i* and 22*i* of the intermediate portions 21*c* and 22*c* are minimum curved sections has been described, the present invention is not limited thereto but the design of the maximum curved sections and the minimum curved sections may be appropriately changed.

In addition, in the above-described embodiments, while a configuration in which the first connecting plate 21 and the second connecting plate 22 are disposed in two rows in the tire width direction H as the connecting member 15 has been described, the present invention is not limited thereto but the connecting members 15 may be disposed in a plurality of rows, in three rows or more, or in one row in the tire width direction H.

In addition, the plurality of connecting members 15 may be installed between the exterior body 12 and the ring-shaped body 13 in the tire width direction H.

In addition, instead of the above-described embodiments, for example, the second end sections 21*b* and 22*b* of the first connecting plate 21 and the second connecting plate 22 may be connected at opposite positions with the axis O sandwiched therebetween on the outer circumferential surface of the exterior body 12 in the tire radial direction, or may be connected to the first end sections 21*a* and 22*a* of the first connecting plate 21 and the second connecting plate 22 at opposite positions in the tire radial direction on the outer circumferential surface of the exterior body 12.

In addition, instead of the above-described embodiments, the first end sections 21*a* and 22*a* of both of the connecting plates 21 and 22 may be connected at different positions in the tire circumferential direction on the inner circumferential surface of the ring-shaped body 13.

Further, a gap in the tire width direction H may be formed between the first side split exterior body 25 and the second side split exterior body 26.

In addition, the exterior body 12 and the ring-shaped body 13 may be split into three or more parts in the tire width direction H, or may not be split.

Further, the first and second split case bodies 31 and 32 are not limited to the above-described embodiments but may be formed through, for example, cutting or the like.

In addition, in the above-described embodiments, while the exterior body 12, the ring-shaped body 13 and the plurality of connecting members 15 are integrally formed with each other, the present invention is not limited thereto but the components may be connected to each other after being separately formed. Further, the exterior body 12 may be integrally formed with the attachment body 11.

In addition, in the above-described embodiments, while the configuration in which the first end sections 21*a* and 22*a* of the connecting members 15 are indirectly connected to the attachment body 11 via the exterior body 12 has been described, the present invention is not limited thereto but the first end sections 21*a* and 22*a* of the connecting members 15 may be directly connected to the attachment body 11.

In addition, the components of the above-described embodiments may be appropriately substituted with known components without departing from the spirit of the present invention, or the above-described variants may be appropriately combined.

INDUSTRIAL APPLICABILITY

The non-pneumatic tire of the present invention can secure sufficient strength while limiting an increase in weight.

DESCRIPTION OF REFERENCE SIGNS 1 non-pneumatic tire
11 attachment body
12 exterior body
13 ring-shaped body
15 connecting member
21 first connecting plate
22 second connecting plate
21*a*, 22*a* first end section
21*b*, 22*b* second end section 21d to 21j, 22d to 22j, 121d to 121k, 122d to 122k curved section
H tire width direction
L imaginary line
O axis

The invention claimed is:
1. A non-pneumatic tire comprising:
an attachment body attached to an axle;
a cylindrical exterior body fitted onto the attachment body;
a ring-shaped body configured to surround the attachment body from the outside in a tire radial direction;
a tread member disposed at an outer circumferential surface side of the ring-shaped body; and
a plurality of connecting members disposed between the attachment body and the ring-shaped body in a tire circumferential direction and configured to displaceably connect the attachment body and the ring-shaped body,
wherein the exterior body is integrally formed with the ring-shaped body and the plurality of connecting members by resin material,
each of the plurality of connecting members comprises a first connecting plate and a second connecting plate as a pair of connecting plates configured to connect the attachment body and the ring-shaped body,
a first end section of the first connecting plate connected to the ring-shaped body is disposed closer to a first side in the tire circumferential direction than a second end section connected to the attachment body,
a first end section of the second connecting plate connected to the ring-shaped body is disposed closer to a second side in the tire circumferential direction than the second end section connected to the attachment body,
each of the pair of connecting plates extends in one direction in a side view of the tire when the tire is seen from a tire width direction and has a plurality of curved sections curved in the tire circumferential direction in the one direction thereof,
in the plurality of curved sections of each of the pair of connecting plates, a thickness of a maximum curved section in which a central angle about a center of curvature of each of the curved sections is largest is maximized, and a thickness of a minimum curved section in which a central angle about a center of curvature of each of the curved sections is smallest is minimized, and
in each of the air of the connecting plates, the maximum curved section is joined to the first end section, the minimum curved section is disposed at an intermediate portion disposed between the first end section and the second end section, and one curved section of the plurality of curved sections excluding the maximum curved section and the minimum curved section is joined to the second end section.

2. The non-pneumatic tire according to claim 1, wherein
in the intermediate portion of the second connecting plate, curved sections separately joined to the first end section and the second end section are formed to protrude toward first side in the tire circumferential direction, and
in the intermediate portion of the second connecting plate, curved sections separately joined to the first end section and the second end section are formed to protrude toward first side in the tire circumferential direction.

* * * * *